United States Patent [19]

Rampel

[11] Patent Number: 5,185,221
[45] Date of Patent: Feb. 9, 1993

[54] METAL HYDRIDE ELECTRODE AND ELECTROCHEMICAL CELL

[75] Inventor: Guy G. Rampel, Gainesville, Fla.

[73] Assignee: Gates Energy Products, Inc., Gainesville, Fla.

[21] Appl. No.: 832,108

[22] Filed: Feb. 6, 1992

[51] Int. Cl.⁵ .......................................... H01M 10/34
[52] U.S. Cl. ..................................... 429/59; 429/101
[58] Field of Search ........................ 429/59, 101, 137

[56] References Cited

U.S. PATENT DOCUMENTS

| | | | |
|---|---|---|---|
| 4,888,256 | 12/1989 | Zuckerbrod | 429/59 X |
| 5,043,234 | 8/1991 | Tomantschger et al. | 429/59 S |
| 5,053,292 | 10/1991 | Haseby et al. | 429/101 |

Primary Examiner—Stephen Kalafut
Attorney, Agent, or Firm—C. H. Castleman, Jr.; J. L. Isaas; S. G. Austin

[57] ABSTRACT

A metal hydride negative electrode plate for use in an alkaline electrochemical cell is disclosed including a conductive substrate carrier, a layer of electrochemically active hydrogen storage alloy material capable of reversibly storing hydrogen attached to the carrier, and the presence of a layer of carbon particles affixed to the outer surface of the active material layer. The carbon particle layer is present as a uniform distribution on the surface of the active material layer and prevents substantial oxidation of the active hydrogen storage alloy material during charge and overcharge of an alkaline cell incorporating the carbon coated metal hydride negative electrode of the invention.

12 Claims, 1 Drawing Sheet

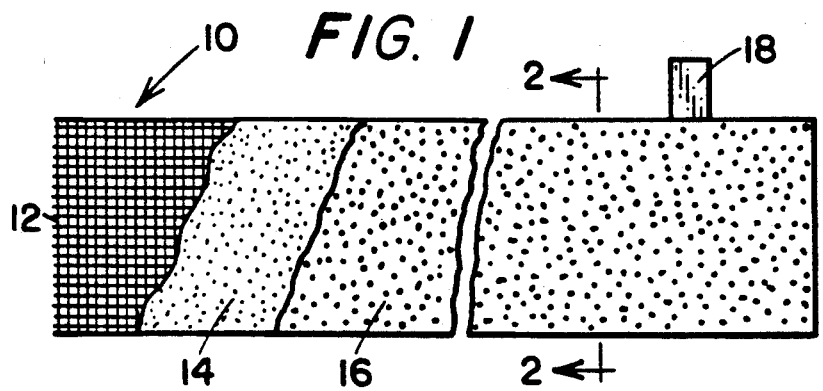
FIG. 1
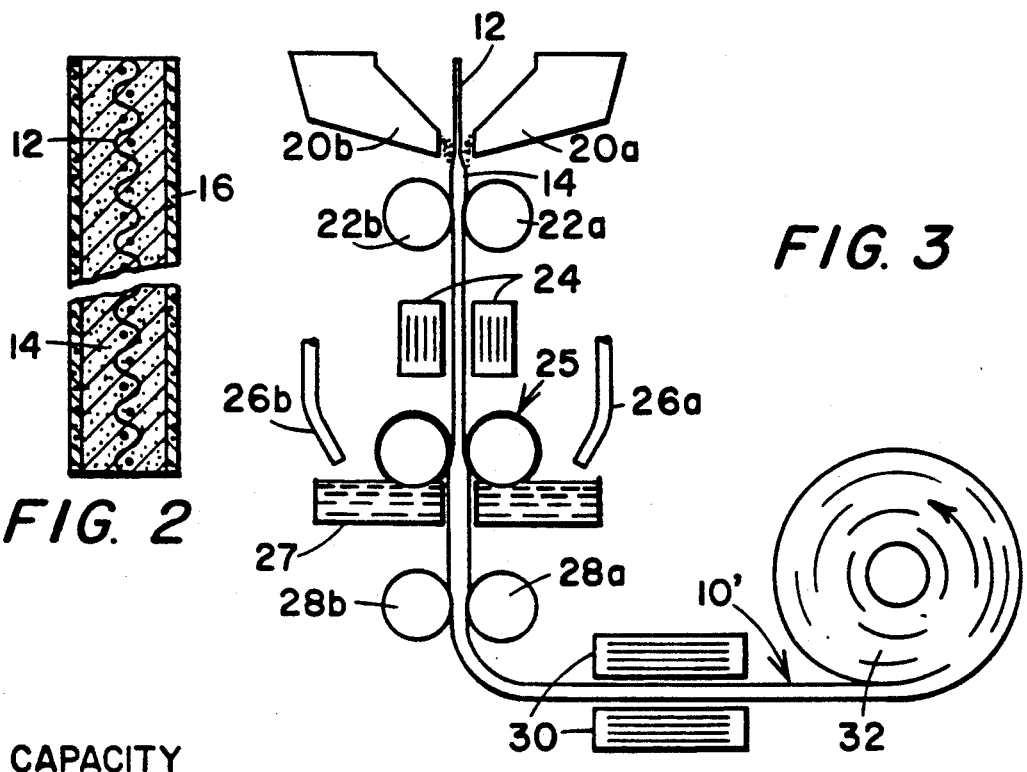
FIG. 2
FIG. 3
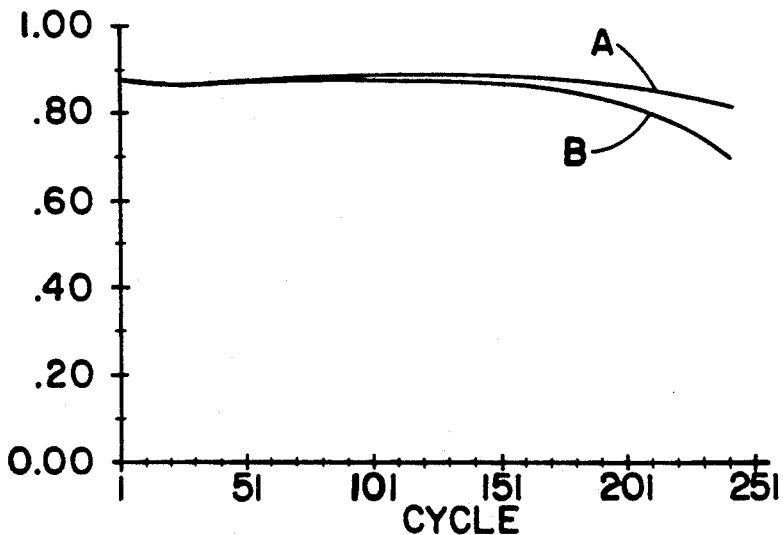
FIG. 4

METAL HYDRIDE ELECTRODE AND ELECTROCHEMICAL CELL

BACKGROUND OF THE INVENTION

This invention relates to metal hydride electrodes and electrochemical cells incorporating the same.

Sealed or semi-sealed nickel metal hydride alkaline cells employ hydrogen storage alloy materials as the electrochemically active material for the negative electrode. These alloy materials are believed to possess catalytically active sites for dissociating hydrogen molecules to increase the rate at which hydrogen absorption and desorption can be accomplished. Cells made with these hydrogen storage alloy materials forming the basis of the negative electrode are typically matched against nickel positive electrodes with alkaline electrolyte in a sealed configuration operating in some respects analogously to a nickel-cadmium cell.

In a nickel metal hydride cell oxygen is generated at the positive nickel electrode during charge and overcharge and, particularly in starved electrolyte systems, passes directly through the porous, unsaturated separator layer to attack and oxidize the hydrogen storage alloy material in the negative plate. The metal hydride alloy, once oxidized, no longer serves as an efficient hydriding material since the resultant insulative oxide layer that is formed on the alloy passivates the alloy and prevents it from absorbing and desorbing hydrogen, particularly at elevated rates of discharge and charge. Thus oxygen and hydrogen can accumulate in the cell at concentrations sufficient to form an explosive mixture, provided an ignition source is supplied. In addition, some forms of the oxidized alloys are soluble in the alkaline electrolyte and become dissolved and migrate away from the negative electrode. Furthermore, oxidized hydrogen storage alloy materials lose conductivity. These problems stemming from oxidation of the alloy are not present in the well-known nickel-cadmium sealed cell wherein the cadmium oxide which is formed readily hydrolyzes to cadmium hydroxide, an electrochemically active form of cadmium.

In nickel-cadmium sealed cells it is known that cell pressure can be reduced by coating the cadmium electrode with carbon (see, for instance, U.S. Pat. No. 4,614,696 to Ito et al. and U.S. Pat. No. 4,987,041 to Simon and Japanese patent application no. 58-190444).

A primary object of this invention is to provide means for protecting the hydrogen storage alloy material in the negative electrode to prevent it from becoming oxidized during operation of a cell incorporating the electrode, and thereby maintaining the hydriding capability of the alloy, prevent its dissolution in the electrolyte, and maintain high levels of conductivity.

SUMMARY OF THE INVENTION

In one aspect, the invention is directed to a metal hydride negative electrode plate for use in an alkaline electrochemical cell, including a conductive substrate carrier, and a layer of electrochemically active hydrogen storage alloy material capable of reversibly storing hydrogen and attached to the carrier, the improvement residing in the presence of a layer of carbon particles affixed to the outer surface of the active material layer.

In another aspect, the invention is directed to an alkaline electrochemical cell, such as a normally sealed nickel metal hydride cell, configured to prevent substantial oxidation of the active hydrogen storage alloy material during normal charge and overcharge of the cell despite the development of oxygen within the cell.

BRIEF DESCRIPTION OF THE DRAWINGS

Preferred embodiments of the invention will be illustrated in conjunction with the accompanying drawings, in which like numerals designate like parts, and in which:

FIG. 1 is a side elevational, partially broken-away view of an electrode constructed in accordance with the invention;

FIG. 2 is a schematic partial sectional view of the electrode taken along 2—2 of FIG. 1;

FIG. 3 is a schematic process flow diagram illustrating one means for producing the electrode of the invention; and FIG. 4 is a graph plotting capacity of sealed nickel metal hydride cells versus charge/discharge cycles, comparing sealed nickel metal hydride cells of the invention with control cells.

PREFERRED EMBODIMENTS OF THE INVENTION

The metal hydride negative electrode plate of the invention, while intended for use with a nickel counter electrode in sealed alkaline electrochemical cells, either hermetically sealed or equipped with a resealable safety valve, the electrode may also be used in semi-sealed or flooded cells and still benefit from the oxidation resistance provided by the special coating of the invention. Depending upon the thickness and relative rigidity of the electrode, the electrode of the invention may be configured to have the flexibility required for winding to form electrode roll cell packs for standard AA, C, and D-size cylindrical cells, and the like, or prismatic cells of various sizes and for various applications.

Referring to FIGS. 1 and 2, the metal hydride negative electrode plate of the invention is shown generally at 10 and includes a conductive substrate carrier 12 which may be formed of wire screen, mesh, foil or the like on which has been applied on at least one side thereof a layer of electrochemically active hydrogen storage alloy material 14. In accordance with the invention at least one but preferably both major faces of the active material layer 14 bears a coating of carbon particles in a relatively thin layer which is affixed to the outer surface of the active material layer, acting as a catalyst to consume oxygen which is present in a cell and prevent it from substantially oxidizing the active hydrogen storage alloy material present on the surface and in the interior of the electrode. In standard fashion electrode 10 may be provided with a current collector tab 18 for delivering current to the negative terminal of a cell employing the electrode.

The invention is applicable to any electrochemically active hydrogen storage alloy material which is normally subject to passivation or reduction in activity as a result of oxidation in an associated cell. Thus, the invention applies to alloys of the so-called $AB_2$ type as disclosed, for instance, in U.S. Pat. No. 4,431,561 (Ovshinsky et al.) and U.S. Pat. No. 4,716,088 (Reichman et al.). The preferred $AB_2$ type materials, as currently envisioned, are based on $TiNi_2$ and typically have the basic atomic structure Ni—Ti—V—Cr—Zr—X—Y, where X and Y can be other elements of various selection. Another type of hydrogen storage alloy material which is believed to benefit from the protective electrode coating of the invention is the so-called AB$_5$ class, which is based on of the basic formula LaNi$_5$ (typically additional elements may be present, including zirconium, hafnium, cobalt, and various rare earth elements). Hydrogen absorbing alloys of this class are disclosed, for instance, in U.S. Pat. No. 4,216,274 (Bruning et al.) and U.S. Pat. No. 4,375,257 (Bruning et al.). Hybrid AB$_2$/AB$_5$ alloys may also be used.

It has been found that the presence of a carbonaceous coating layer 16 on the outer surface of the active hydrogen storage alloy material layer 14 functions similar to a fuel cell electrode by converting oxygen, which is transported directly from the positive (nickel) electrode through the separator to the surface of the negative electrode, by the catalyzing activity of the carbon, to hydroxyl ions. The hydroxyl ions are then combined with hydrogen present in the alloy (in its atomic form) to produce water. This water which is formed is harmless to the electrode, and by consuming the oxygen at the surface of the electrode the oxygen is substantially prevented from reaching the hydrogen storage alloy on the surface and in the electrode interior, which could otherwise become oxidized and passivated. To achieve this result it is preferred to use a substantially uniform distribution of carbon particles on the surface of the electrode, with sufficient coverage, and yet without blocking access by the electrolyte, to prevent substantial oxidation of the active hydrogen storage material during normal charge and overcharge of the cell in which oxygen is developed. There is the further advantage that the partial pressure of both the oxygen and hydrogen is accordingly reduced, since the carbon particles in effect scavenge the oxygen molecules, and the hydrogen storage alloy material remains active to absorb and desorb hydrogen.

It has been found that a relatively thin carbon layer is sufficient to reduce the oxygen and preclude its penetration into, and passivation of, the active hydrogen storage alloy material 14 in the body of the electrode. Preferably from about 0.025 to about 1.0, more preferably from about 0.03 to about 0.5 and most preferably from about 0.04 to about 0.09 mg carbon is applied per cm$^2$ of each face of electrode surface. Preferably both sides of the electrode are coated for optimum passivation resistance.

The carbon particles are preferably in the form of a powder of high specific surface which may be applied in any convenient fashion. A preferred application technique involves the application of the carbon from a suspension in a binder solution, preferably a water soluble binder. The carbon may be supplied from any suitable source, such as from a powder of conventional carbon blacks, such as acetylene black, furnace black and channel black, although other forms such as graphite can be used with less efficient results. Catalytically active carbons derived from polymeric precursors (see further U.S. Pat. No. 4,724,063 to McIntyre et al.) may also be used. Typically the carbon particles preferably have a specific surface area from about 100 to about 1,500, more preferably from about 500 to about 1,500 m$^2$/g, according to the BET method, DIN 66 132/ASTM D 3037 standards. Using higher surface area carbons reduces the total mass of carbon required.

Although the carbon particles may be applied other than from a suspension, with or without a binder, it is preferred to use a binder, particularly of the water soluble type, such as polymers of low molecular weight polyacrylic acids and their corresponding sodium salts, carboxymethylcellulose, polyvinyl alcohol, polyethylene, latex emulsions, and hydroxypropylcellulose. The binder is present in association with the carbon particles, in an amount from about 20 to about 75 weight percent of the carbon particles.

Dispersions or suspensions of the carbonaceous material in a binder may be applied to the electrode surface in any desirable way such as by brushing, dipping, roll coating, spraying and the like.

It is highly preferred to confine the carbon particles substantially to the surface of the electrode, including some penetration into the electrode, however avoiding mixing the carbon particles in the electrode mix 14 itself, since this will reduce the energy density of the electrode, define a path of greater length for the oxygen to diffuse before it is consumed, and allow the oxidation of hydrogen storage alloy material should the oxygen reach the alloy material before it reaches the catalytic carbon sites. For similar reasons, it is preferred that the electrode also be free from the inclusion of hydrophobic materials, such as polytetrafluoroethylene, in the body or at the surface of the electrode.

Referring now to FIG. 3, the electrode of the invention may be produced by delivering the perforated substrate 12 vertically down through hydrogen storage alloy dispensers 20a and 20b where the alloy in powder form is applied to the moving substrate carrier from which it continues through rollers 22a, 22b where it is compacted under a force from at least about 15 tons per inch of width of the substrate, depending upon desired alloy density and electrode porosity. Although beyond the scope of this invention, the hydrogen storage alloy contained in dispensers 20a and 20b, particularly of the AB$_2$ type, may be formed into a powder through standard induction melting techniques, and solidified and ground using hydride/dehydride grinding techniques known in the art. It is preferred in this respect to provide a highly active, dense alloy material layer 14 which advantageously is composed virtually entirely of active material, free of any binder or substantial quantities of other additives which would reduce the energy density of the finished electrode.

Following compaction of the active material powders on to the wire screen carrier 12, the precursor electrode is sintered in furnace 24 in known manner under a controlled atmosphere at an elevated temperature, such as from about 800° to about 950° C. The sintered structure emanating from furnace 24 is then delivered to roll coating apparatus 25 which includes troughs 27 holding the carbon suspension, supplied by a pair of carbon particle dispensers 26a, 26b. These dispensers deliver a carbon particle dispersion, preferably a suspension in a water soluble binder, via the roll coaters to the outer surfaces of the sintered precursor electrode having active hydrogen storage alloy material 14 pressed on both surfaces of substrate carrier 12. The thus coated electrode precursor is then passed through the nip of a pair of final sizing rollers 28a, 28b and then through a drying oven 30 to remove the vehicle (e.g. water from the binder solution), followed by take up of the finished continuous strip electrode 10' on spool 32.

EXAMPLE

For comparison nine AA-size sealed nickel metal hydride cells were prepared and cycled, of which four cells employed the carbon coated metal hydride electrode in accordance with the invention. The remaining five cells, designated as the control cells, were identical with the four cells prepared in accordance with the invention with the exception that the carbon coating on the metal hydride negative electrode was omitted.

The hydrogen storage alloy material employed for the negative electrode was of the $AB_2$ class (Ovonic Battery Company, Troy, Mich.) having the basic alloy composition $Ni_{32}Ti_{16}V_{22}Cr_7Zr_{16}Co_7$. These alloys are manufactured using standard induction melting techniques, solidified and ground to a powder using hydride/dehydride grinding techniques. After further mechanical grinding the alloy powders were pressed onto a nickel screen and were sintered under a controlled atmosphere at 900° C. The sintered electrode plate had a width of 1.582 inches, a length of 4.2 inches and a thickness of 0.0125 inches. Five of these electrodes were used as control electrodes.

Four of such sintered, pressed metal hydride electrodes were further treated by applying a carbon coating on each major face of the electrode by brushing with a carbon dispersion, prepared as follows. A one percent (1%) binder solution of Acrysol® LMW-45 (a polyacrylic acid polymer of the Rohm and Haas Company, approximate molecular weight 4500) was prepared by adding 195.83 g of water to 4.17 g LMW-45 (48 percent concentration) and mixed for 1-2 minutes. To 137.05 g of this binder solution was then added 3.07 g of Printex XE 2 carbon (a conductive black of Degussa Corporation, Ridgefield Park, N.J. having a specific surface area, according to BET DIN 66 132/ASTM D 3037 of about 1,000 $m^2/g$ and a DBP absorption DIN 53 601/ASTM D 2414 of 370) and then mixed to form the desired carbon dispersion.

The four metal hydride electrode strips prepared as discussed above were then coated with the carbon dispersion by applying the carbon dispersion to the major faces of the electrodes by brushing. The weight of the dispersion (carbon suspension) applied to each electrode (both sides) totalled 0.56–0.62 gms. After drying at approximately 85° C. the dry weight of the carbon suspension was equivalent to 0.07–0.08 $mg/cm^2$ per side (face) of electrode. The total area of the electrode was approximately 85.73 $cm^2$.

AA-size cylindrical cells were then constructed using one sintered positive nickel electrode, of standard construction, having a width of 1.574 inches, a length of 2.68 inches and thickness of 0.0272 inches. In all nine cells a non-woven nylon separator was interleaved between the positive and negative electrodes and wound up into a Swiss roll, stuffed into a cell container and 31 percent potassium hydroxide with lithium hydroxide was added to the cells, connections made and a lid sealed to the container. The cells were then subjected to an elevated heat soak at 60° C. for 24 hours. The general configuration of the cell may be as depicted in U.S. Pat. No. 5,004,735 (Rampel et al.), incorporated by reference.

The cells were then tested by cycling using a temperature cut-off test regime. All of the cells were cycled by discharging at 1.0 amps to a cut-off voltage of 1.00 volts, followed by a one-hour rest, charging at 1.0 amps for 1.50 hours, and then rested for 2.00 hours, all at 25° C. This cycle regime was continued and the capacities measured, as graphically illustrated in FIG. 4. Curve A of FIG. 4 represents the average capacities of the four cells made in accordance with the invention utilizing the carbon coating 16 on the metal hydride negative electrodes. Curve B represents the average capacities for the same cycling regime employing the control negative electrodes having no carbon coating applied to the surface of the active material 14. As shown in FIG. 4, the cells of the invention maintained higher capacity through approximately 250 cycles. It is believed that the improved cycling capacities of the cells of the invention were directly attributable to the presence of the carbon coating which prevented oxidation of the hydrogen storage alloy material. It is believed that the improvement in cycling capacity of the cells of the invention would be even more dramatic at higher rates of charge and discharge.

It was also found that the cells of the invention had significantly reduced internal pressures compared to the control cells, with a particularly reduced oxygen partial pressure, indicating conversion by the carbon. Accordingly, the possibility of producing an explosive mixture of oxygen and hydrogen in the cell was significantly reduced compared to the control cells.

As a further advantage, the outer electrode of the wound cylindrical roll preferably bears the carbon coating, which significantly eases insertion of the roll into the container, by lowering the coefficient of friction of the hard alloy materials.

While certain representative embodiments and details had been shown for the purpose of illustrating the invention, it will be apparent to those skilled in this art that various changes and modifications may be made therein without departing from the spirit or scope of the invention. The invention illustratively disclosed herein suitably may be practiced in the absence of any element which is not specifically disclosed herein.

What is claimed is:

1. A metal hydride negative electrode plate for use in an alkaline electrochemical cell, including a conductive substrate carrier, and a layer of electrochemically active hydrogen storage alloy material capable of reversibly storing hydrogen attached to the carrier, the improvement comprising the presence of a layer of carbon particles affixed to the outer surface of the active material layer.

2. The electrode plate of claim 1 wherein in use in the cell the layer of carbon particles is present in an amount, and in such uniform distribution on the surface of the active material layer, to prevent substantial oxidation of the active hydrogen storage alloy material during normal charge and overcharge of the cell despite the development of oxygen in the cell.

3. The electrode plate of claim 1 in which there is present in association with the carbon particles a binder in an amount from about 20 to about 75 weight percent of the weight of the carbon particles.

4. The electrode plate of claim 1 wherein the carbon particles have a surface area measured by the BET method from about 100 to about 1,500 $m^2/g$.

5. The electrode plate of claim 2 wherein the layer of carbon particles substantially covers the entire outer surface of the active material layer.

6. The electrode plate of claim 1 wherein the hydrogen storage alloy material is a $TiNi_2$ based material.

7. The electrode plate of claim 1 wherein the hydrogen storage alloy material is a $LaNi_5$ based material.

8. An alkaline electrochemical cell comprising a nickel positive electrode, a metal hydride negative electrode employing an electrochemically active hydrogen storage alloy material capable of reversibly storing hydrogen, a porous separator interposed between the positive nickel electrode and negative metal hydride electrode, and an alkaline electrolyte, the improvement comprising the presence of a layer of carbon particles affixed to the outer surface of the active material layer of the metal hydride electrode.

9. The cell of claim 8 wherein the carbon particles as present in an amount, and in such uniform distribution on the surface of the negative active material layer, to prevent substantial oxidation of the active hydrogen storage alloy material during normal charge and overcharge of the cell despite the development of oxygen in the cell.

10. The cell of claim 8 wherein the hydrogen storage alloy material is a Ni—Ti—V—Cr—Zr based material.

11. The cell of claim 8 wherein the hydrogen storage alloy material is a $LaNi_5$ based material.

12. The cell of claim 8 wherein from about 0.025 to about 1.0 mg of carbon are present per $cm^2$ of surface area of each face of the negative electrode.

* * * * *